United States Patent
Malichenko et al.

(10) Patent No.: US 10,880,750 B2
(45) Date of Patent: Dec. 29, 2020

(54) ADAPTIVE SPATIAL REUSE

(71) Applicant: SEMICONDUCTOR COMPONENTS INDUSTRIES, LLC, Phoenix, AZ (US)

(72) Inventors: Dmitrii Malichenko, Saint-Petersburg (RU); Sigurd Schelstraete, Menlo Park, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/686,367

(22) Filed: Nov. 18, 2019

(65) Prior Publication Data
US 2020/0187011 A1 Jun. 11, 2020

Related U.S. Application Data

(60) Provisional application No. 62/777,743, filed on Dec. 10, 2018.

(51) Int. Cl.
| | |
|---|---|
| *H04W 16/10* | (2009.01) |
| *H04W 24/10* | (2009.01) |
| *H04W 24/02* | (2009.01) |
| H04W 84/12 | (2009.01) |

(52) U.S. Cl.
CPC ........... *H04W 16/10* (2013.01); *H04W 24/02* (2013.01); *H04W 24/10* (2013.01); *H04W 84/12* (2013.01)

(58) Field of Classification Search
CPC ...... H04W 16/10; H04W 24/02; H04W 24/10
See application file for complete search history.

(56) References Cited

U.S. PATENT DOCUMENTS

| | | | | |
|---|---|---|---|---|
| 2002/0155829 | A1* | 10/2002 | Proctor, Jr. | H04L 41/12 455/423 |
| 2012/0147801 | A1* | 6/2012 | Ho | H04W 52/365 370/311 |
| 2013/0315162 | A1* | 11/2013 | Farkas | H04L 5/0062 370/329 |

(Continued)

OTHER PUBLICATIONS

LAN/MAN Standards Committee of the IEEE Computer Society, "IEEE P802.11ax™D3.2—Draft Standard for Information technology—Telecommunications and information exchange between systems Local and metropolitan area networks—Specific requirements," IEEE P802.11ax™/D3.2, Oct. 2018 (amendment to IEEE P802.11REVmd/D1.5), 698 pages.

*Primary Examiner* — Ernest G Tacsik
(74) *Attorney, Agent, or Firm* — Ramey & Schwaller, LLP

(57) ABSTRACT

Disclosed wireless networks, wireless devices and methods may provide adaptive spatial reuse to optimize communications performance. In one illustrative embodiment, a wireless network station includes: a baseband processor that frames data units for wireless transmission to a given station; and a radio frequency integrated circuit (RFIC) that couples the baseband processor to one or more antennas. The baseband processor systematically assigns wireless transmission settings to different intervals of data unit transmission to the given station to periodically evaluate a performance for each combination of wireless transmission setting values, the assignment causing settings associated with enhanced performance to be employed with an increased probability or duration.

19 Claims, 5 Drawing Sheets

(56) References Cited

U.S. PATENT DOCUMENTS

| | | | |
|---|---|---|---|
| 2016/0105304 A1* | 4/2016 | Kwon | H04L 27/2665 |
| | | | 370/338 |
| 2017/0006492 A1* | 1/2017 | Khoshnevisan | H04L 5/0073 |
| 2017/0071009 A1* | 3/2017 | Huang | H04W 74/0808 |
| 2020/0053634 A1* | 2/2020 | Patwardhan | H04L 43/0876 |

* cited by examiner

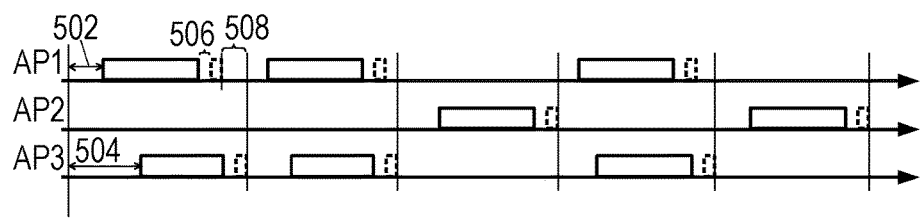
Fig. 5A
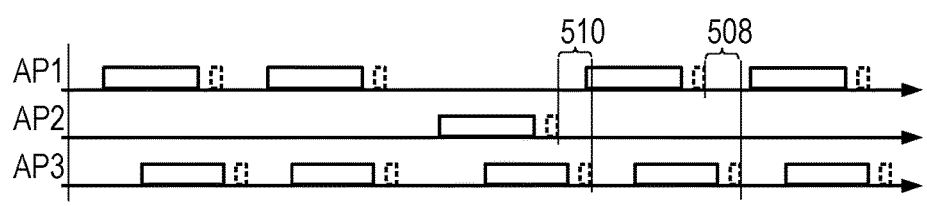
Fig. 5B
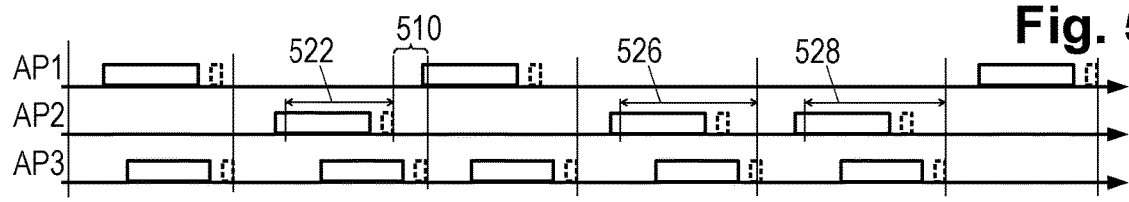
Fig. 5C
Fig. 6
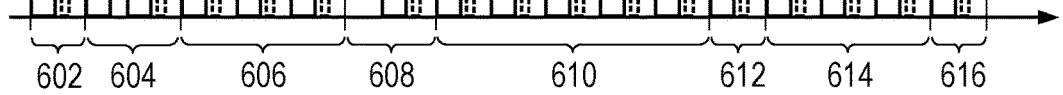

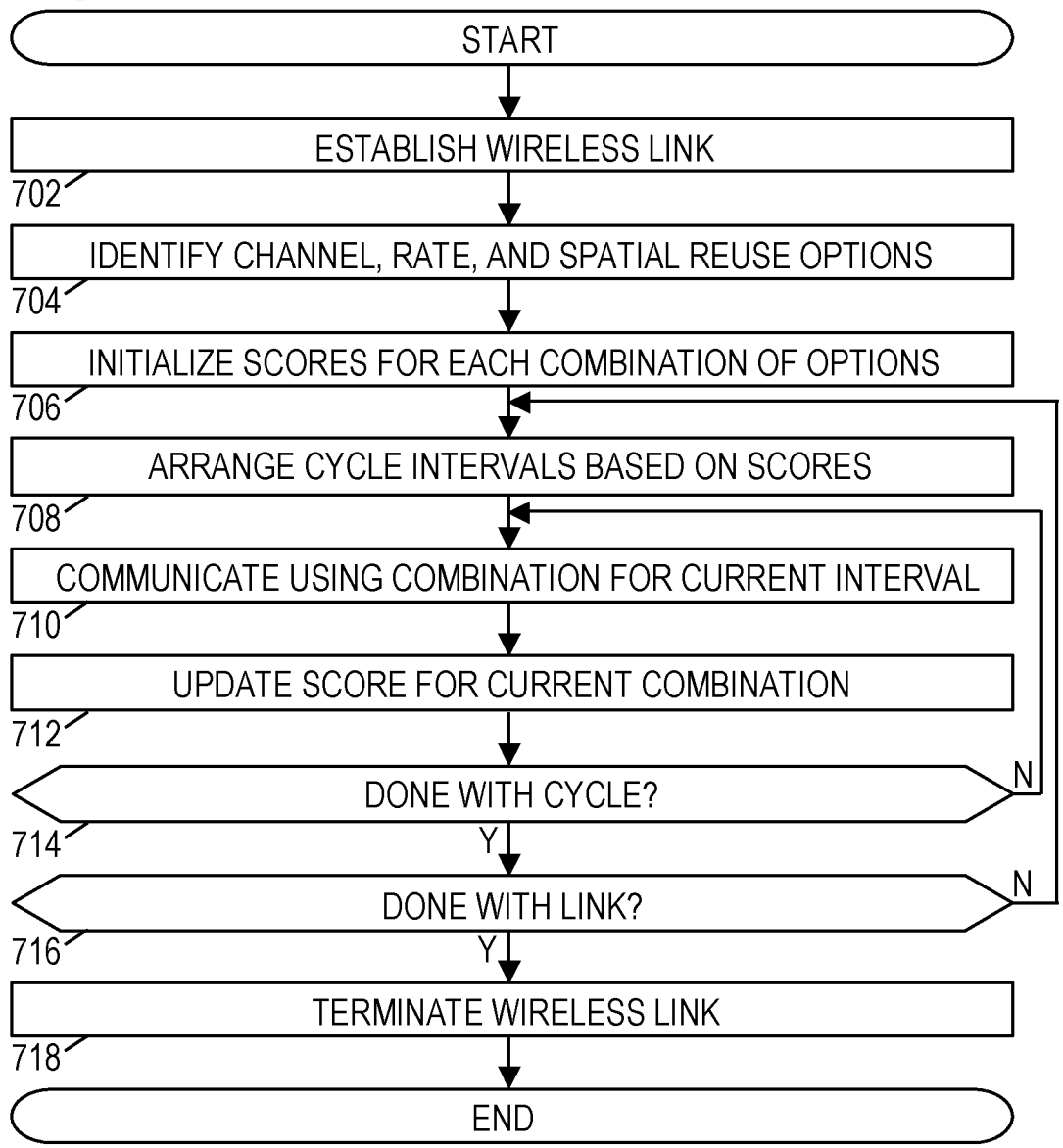

ADAPTIVE SPATIAL REUSE

CROSS-REFERENCE TO RELATED APPLICATIONS

The present application claims priority to Provisional U.S. Patent App. 62/777,743, titled "Adaptive Spatial Reuse" and filed 2018 Dec. 10 by inventors Dmitrii Malichenko and Sigurd Schelstraete. The foregoing application is hereby incorporated herein by reference in its entirety.

FIELD

The field of the present disclosure relates in general to wireless local area networks providing spatial reuse and, more specifically, to equipping such networks with adaptive spatial reuse control operations.

BACKGROUND

Spatial Reuse (SR) was introduced by the Institute of Electrical and Electronics Engineers (IEEE) in a recent standard (IEEE 802.11ax) to enable overlapping basic service sets (OBSS) to use the medium in a more efficient way when implementing wireless local area networks (WLANs). SR is intended for dense deployments, where range overlap is common between adjacent WLANs. IEEE 802.11ax specifies two methods for determining when SR can be employed: OBSS packet detection level ("OBSS_PD") based and spatial reuse parameter ("SRP") based. In both cases, the standard may permit SR to be employed under conditions in which it inadvertently degrades network performance. The authors are unaware of any prior art method for employing SR to optimize network performance in a consistent fashion.

SUMMARY

The issues identified above may be addressed at least in part by wireless networks, wireless devices and methods that provide adaptive spatial reuse. In one illustrative embodiment, a wireless network station includes: a baseband processor that frames data units for wireless transmission to a given station; and a radio frequency integrated circuit (RFIC) that couples the baseband processor to one or more antennas. The baseband processor systematically assigns wireless transmission settings to different intervals of data unit transmission to the given station to periodically evaluate a performance for each combination of wireless transmission setting values, the assignment causing settings associated with enhanced performance to be employed with an increased probability or duration.

In an illustrative method embodiment, a wireless communication method includes: framing data units for wireless transmission to a given station over multiple intervals, each interval providing for transmission of at least one said data unit; and varying wireless transmission settings for the multiple intervals to periodically evaluate a performance for each combination of wireless transmission setting values, said varying including employing a combination associated with enhanced performance with an increased duration or probability.

In another illustrative embodiment, a non-transitory information storage medium includes instructions that, when executed by a processor, cause the processor to implement the wireless communications method above.

Each of the foregoing embodiments may be employed together with any one or more of the following optional features: 1. the wireless transmission settings include the enabling and disabling of Spatial Reuse (SR). 2. the wireless transmission settings include channel selection. 3. the wireless transmission settings include a modulation coding scheme (MCS) rate. 4. the evaluation of performance is based on one or more of: throughput, latency, retry count, and average contention duration. 5. the baseband processor concurrently frames data units for wireless transmission to multiple stations. 6. the baseband processor separately evaluates the performance of each combination of wireless transmission setting values for each of the multiple stations, and separately assigns wireless transmission settings to different intervals of data unit transmission to each of the multiple stations. 7. memory that stores firmware, the firmware configuring the baseband processor to perform said systematic assigning and the periodic evaluation. 8. each of the different intervals provides for transmission of at least one of said data units. 9. the baseband processor allocates a probability for each combination of wireless transmission setting values, and adjusts the probabilities based on measurements of said performance. 10. the baseband processor groups multiple such intervals into each of multiple cycles, and wherein the baseband processor adjusts durations of the intervals associated with each combination of wireless transmission setting values based on measurements of said performance. 11. the wireless network station operates as a wireless network access point.

BRIEF DESCRIPTION OF THE DRAWINGS

The structure and operation of the example implementations will be understood from a review of the following detailed description and the accompanying drawings in which like reference numerals refer to like parts and in which:

FIG. 5A is a baseline example of wireless medium access without OBSS spatial reuse (SR).

FIG. 5B is an example of wireless medium access with OBSS SR.

FIG. 5C is an example of wireless medium access with projected OBSS SR.

FIG. 6 shows an illustrative sequence of signaling intervals.

FIG. 7 is a flow diagram of an illustrative method providing adaptive SR.

DETAILED DESCRIPTION

Figure 1:
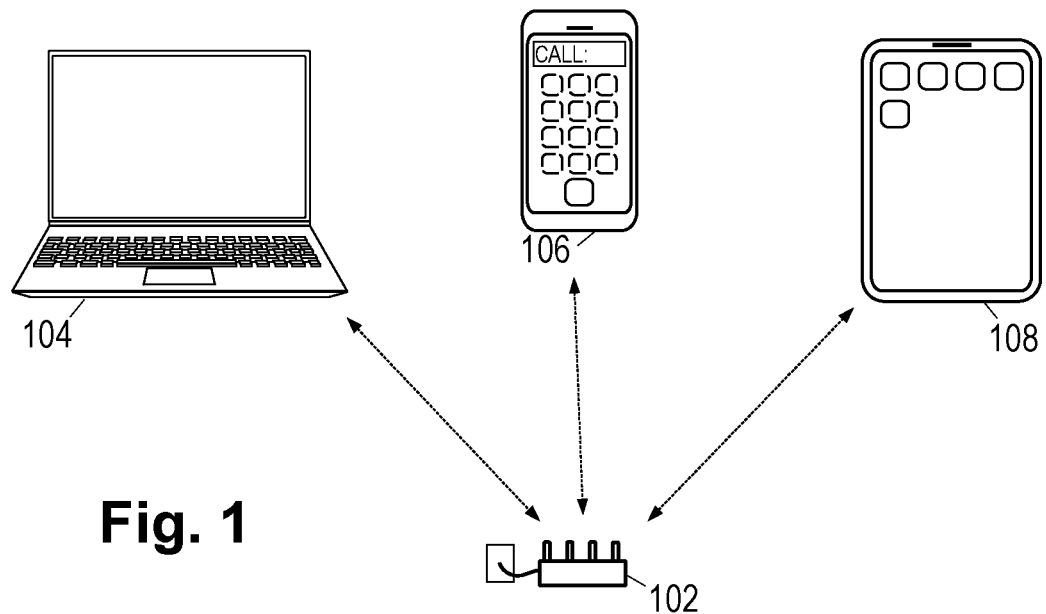
FIG. 1 shows an illustrative wireless network.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

FIG. 1 shows an illustrative wireless network enabling wireless communication between multiple devices 102-108. Wireless device 102 is illustrated as an access point or "base station" supporting wireless communication links with each of multiple mobile devices or "mobile stations". Mobile station 104 is shown as a laptop computer, station 106 is shown as a mobile phone, and station 108 is shown as a tablet computer. In practice, any wireless device that complies with the IEEE 802.11 standard (or extensions thereof) may form part of the wireless network.

The 802.11 standard refers to an access point 102 and its wirelessly connected stations 104-108 as a "basic service set" (BSS). As more access points are deployed it is becoming increasingly common for multiple BSS's to share the same frequency channel and have ranges that overlap, potentially causing interference. The collection of BSS's in the same channel having overlapping ranges is called an overlapping BSS (OBSS). If the interference becomes excessive, the average performance of each BSS plummets because different BSS essentially have to "time-share" the available resources. The IEEE 802.11ax standard seeks to curtail this performance loss by enabling communications to occur concurrently in interfering BSS's under certain limited circumstances. Such concurrent communications are called "spatial reuse" (SR) because the prohibition against multiple interfering communications (communications occurring at a given frequency within a given region) is at least conditionally suspended, partly based on the perceived or assumed location of the devices.

Figure 2:
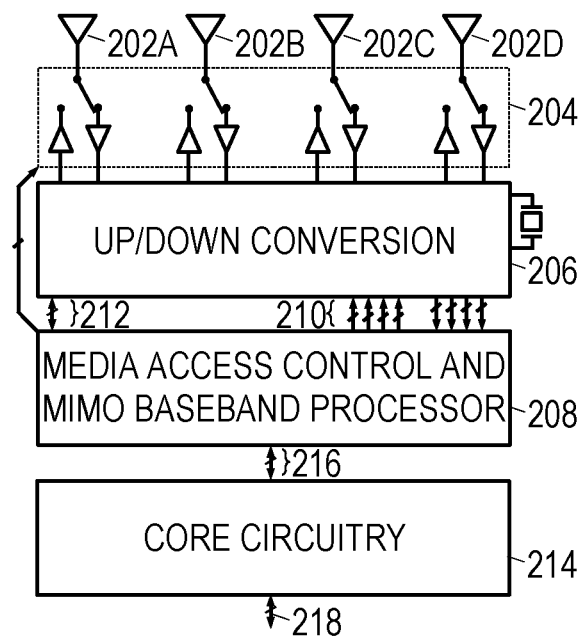
FIG. 2 is a block diagram of an illustrative wireless device.

FIG. 2 is a block diagram of an illustrative wireless device, which could be a base station or a mobile station. One or more antennas 202A-202D are coupled by a driver interface 204 to a radio frequency integrated circuit (RFIC) 206, which in turn connects to a baseband processor circuit 208. The driver interface 204 switches between transmit and receive modes under control of the baseband processor 208. The RFIC 206 performs frequency up conversion of analog transmit signals received from the baseband processor 208 to provide the RF transmit signals to the driver interface and performs frequency down conversion of the RF receive signals from the driver interface to provide the analog receive signals to the baseband processor 208. The analog transmit/receive signals 210 may be conveyed as in-phase and quadrature (I/Q) signals between the RFIC and processor. The processor 208 further provides control bus signals 212 for the driver interface and for controlling and monitoring operation of the RFIC.

Baseband processor 208 acts as a network interface peripheral, accepting a transmit data stream from the wireless device's core circuitry 214 and supplying a receive data stream to the core circuitry. The core circuitry 214 implements the main function of the wireless device, e.g., the functionality of a laptop computer, tablet, smart phone, etc. The core circuitry 214 may further interface to other data sources or sinks via a suitable communications bus 218.

The baseband processor may provide interleaving, error coding, scrambling, demultiplexing, modulation, and multiple-input multiple-output (MIMO) distribution of the transmit data stream to generate the analog transmit signals, and may perform the inverse operations to covert the analog receive signals into the receive data stream. The baseband processor 208 further implements the media access control (MAC) aspects of the standard, including the determination of how and whether to employ the spatial reuse (SR) features of the standard. The baseband processor 208 may be implemented as application-specific integrated circuitry (ASIC) alone or in combination with a programmable processor executing firmware stored in memory to carry out the methods described further herein.

In IEEE 802.11ac and earlier versions of the 802.11 standard, a station performs a clear channel assessment (CCA) before transmission. The CCA is performed by measuring the power level ("CCA level") of any physical-layer protocol data units ("PPDUs") received on the selected channel. If the CCA level is above a default threshold of −82 dBm, the station defers its transmission onto the wireless medium. Transmission deferral may be caused either by stations in the same basic service set (BSS) or by stations from overlapping BSS's. In a dense deployment such deferrals can significantly decrease a station's throughput.

Figure 3A:
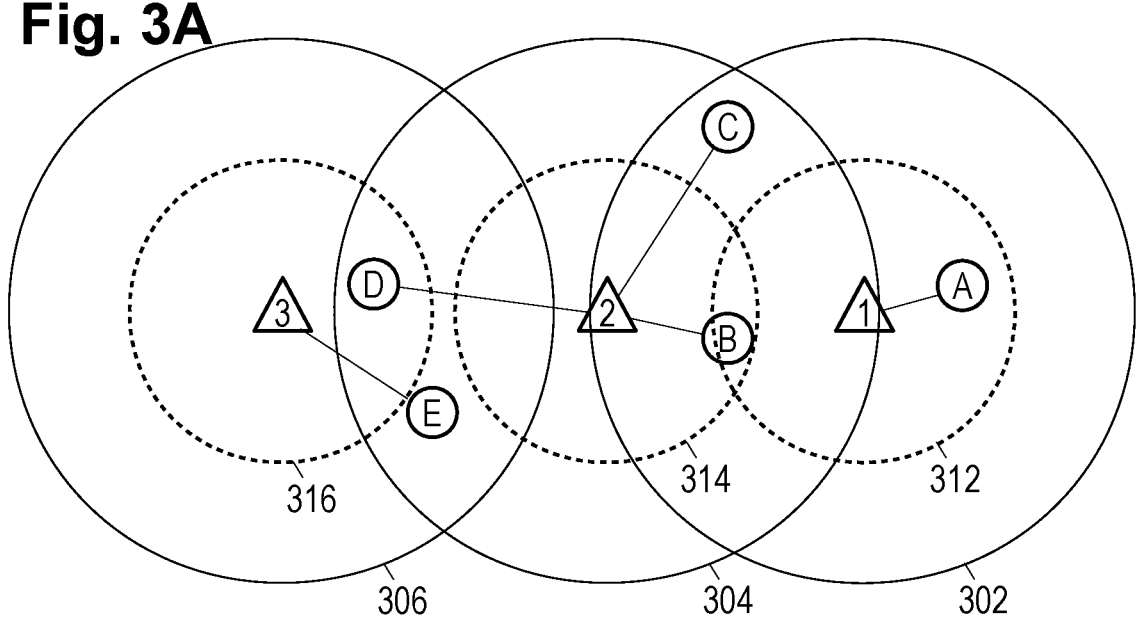
FIG. 3A is a representation of illustrative overlapping basic service sets (OBSS).

FIG. 3A provides an OBSS example, in which base station 1 has a wireless connection with mobile station A; base station 2 has wireless connections with mobile stations B, C, and D; and base station 3 has a wireless connection with mobile station E. With reference to FIG. 1, base station 2 could represent access point 102 and mobile stations B-D could represent wireless devices 104-108. Circle 302 represents the range of base station 1, i.e., the distance at which a transmission from a mobile station would be received at a power level of −82 dBm. Similarly, circles 304 and 306 represent the ranges of base stations 2 and 3, respectively. Notably, circle 304 encloses stations from adjacent BSS's, i.e., base station 1 and mobile station E. Circle 302 encloses multiple stations from an adjacent BSS, i.e., base station 2 and mobile stations B, C. Circle 306 encloses one station from an adjacent BSS, i.e., mobile station D.

In this example, there are numerous instances where a transmission deferral may result. Under the earlier versions of the 802.11 standard, PPDU transmissions from any of stations 2, B, or C could cause station 1 to defer a transmission to station A. Conversely, a transmission from station 1 could cause stations 2, B, and C to each defer their transmissions.

IEEE 802.11ax provides for the use of a different CCA threshold for transmissions from overlapping BSS's (inter-BSS) as compared with the default CCA threshold used for transmissions originating in the same BSS (intra-BSS). This different CCA threshold is referred to as the overlapping BSS packet detection (OBSS_PD) level and it's used in combination with the default CCA threshold. If a station detects a CCA level higher than −82 dBm but less than the OBSS_PD level, the station doesn't need to defer its transmission if the following conditions are met: the received packet is an inter-BSS packet; and the packet doesn't carry acknowledgment (Ack), BlockAck, or Clear To Send (CTS) frame. (This list is illustrative; additional conditions may apply.)

Referring again to FIG. 3A, the broken-line circles 312, 314, and 316 represent the OBSS_PD ranges of stations 1, 2, and 3, respectively, for a given OBSS_PD level. Transmissions from stations outside the broken-line circles would be received with CCA levels below the given OBSS_PD level, whereas transmissions from OBSS stations inside the circles would be received with CCA levels above the OBSS_PD level. Thus, with SR enabled, station 1 need not defer its transmissions to station A for transmissions from station 2 or station C.

Figure 3B:
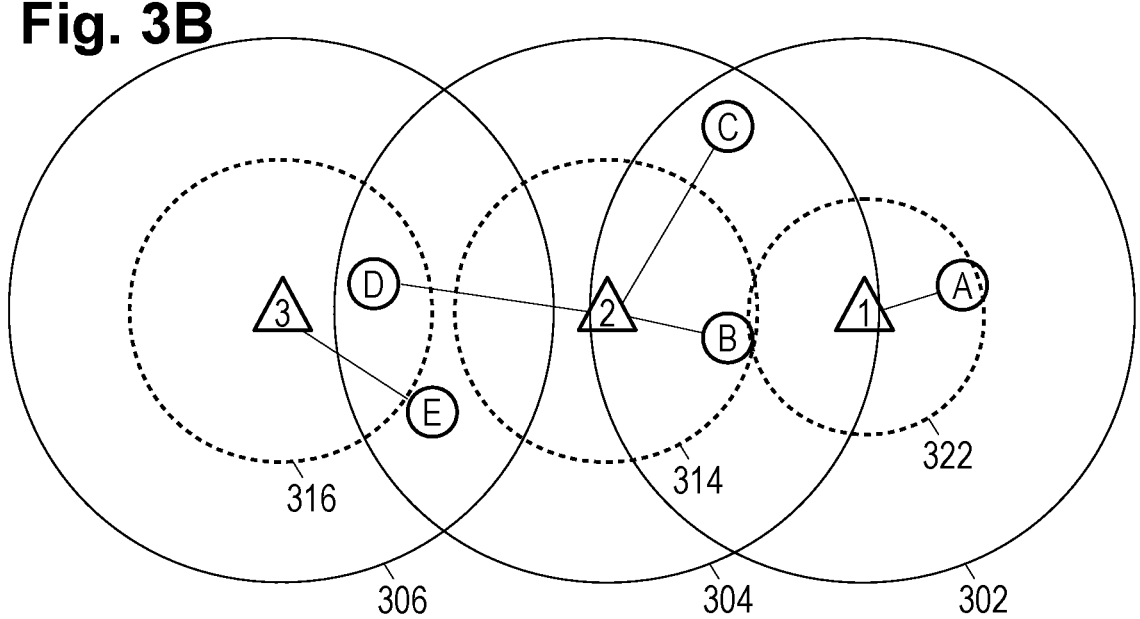
FIG. 3B is an illustrative OBSS with an adjusted packet detection (OBSS_PD) level.

Note that the standard permits the OBSS_PD level to be varied as a function of transmit power. Because station A is close to station 1, station 1 may be able to reduce its transmit power for transmissions to station A. With that reduction in transmit power, the OBSS_PD level can be increased as represented by smaller broken circle 322 in FIG. 3B. The increased OBSS_PD level permits higher CCA levels to be tolerated from OBSS stations, such that station 1 no longer need defer its transmissions when station B is transmitting. Making OBSS_PD lower makes inner circle larger and therefore reduces the number of stations appropriate for SR. Making OBSS_PD higher increases the number of stations appropriate for SR.

Figure 3C:
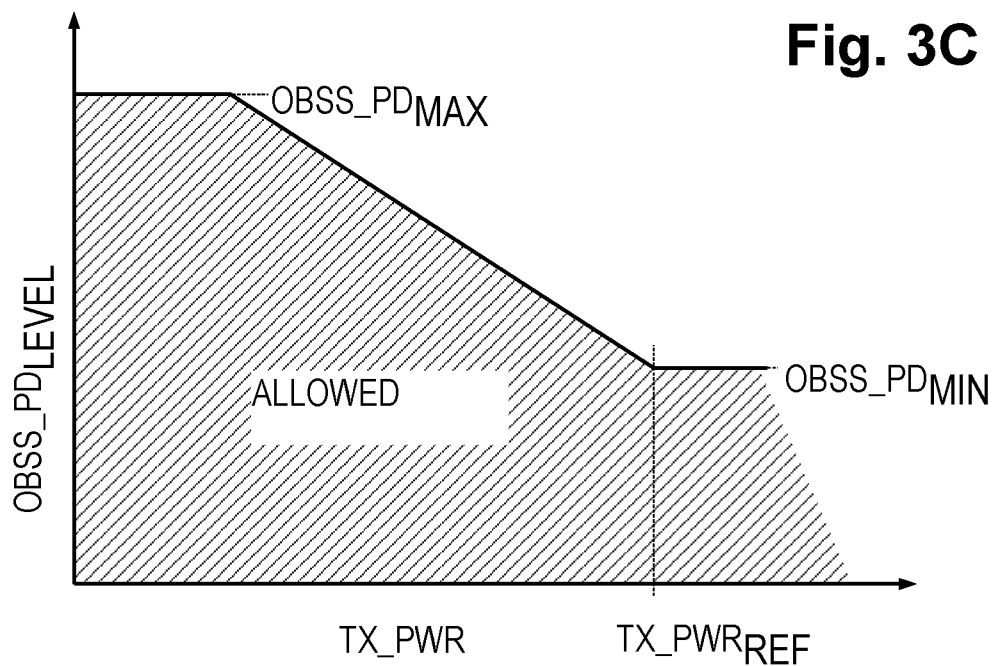
FIG. 3C is a graph of permitted OBSS_PD levels vs transmit power (TX_PWR).

The relationship between OBSS_PD level and allowed transmit power is given in the standard as:

$$OBSS\_PD_{level} \leq \max(OBSS\_PD_{min}, \min(OBSS\_PD_{max}, OBSS\_PD_{min}+(TX\_PWR_{ref}-TX\_PWR)))$$

where $TX\_PWR_{ref}$ is a reference power equal to either 21 dBm or 25 dBm. FIG. 3C shows a graph of this relationship.

Accordingly, the station detecting a CCA level in excess of the default threshold may consider applying a transmit power back-off for any transmission concurrent with the received packet. The observed CCA level can be used to determine the necessary OBSS_PD level, from which a permissible transmit power can be calculated using the foregoing relationship. For example, if some station's transmitting power is less than the reference value TX_PWRref by some amount, then the station can increase its OBSS_PD level by the same amount. Assuming this transmit power remains sufficient for communicating with the target device, this mechanism enables concurrent transmissions and can increase throughput in dense deployment scenarios.

Underlying the OBSS_PD-based mechanism is an apparent assumption that signals being received at relatively lower power at a station attempting to transmit will also be seen as low power signals at the station that is the intended receiver of that attempted transmission. This assumption may not always be correct. For example, consider station 2 (in FIG. 3B) transmitting to station D while either station 3 or E is transmitting. The proximity of station D to stations 3 and E means that it will experience much higher interference than station 2 expects. The OBSS_PD mechanism does not distinguish between these "good" and "bad" cases. Bad cases may lead to frequent transmission failures and retries, significantly impairing network performance. Good cases, as previously discussed enable concurrent transmissions to occur which may significantly enhance network performance relative to prior standards that do not permit SR and consequently force the stations to contend for access.

Figure 4:
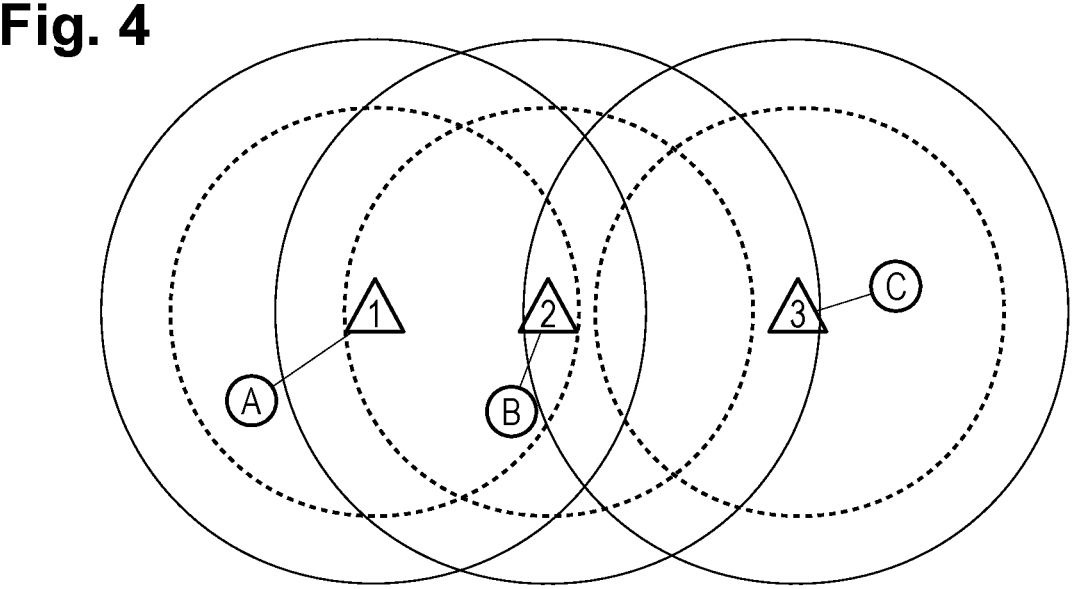
FIG. 4 is a representation of another illustrative OBSS.

FIG. 4 illustrates another OBSS which will be used as a basis for certain examples of access contention below. As illustrated, access point 1 ("AP1") and access point 2 ("AP2") are too close for SR (they are located within each other's OBSS_PD circle). At the same time, AP2 can do SR with access point 3 ("AP3") and vice versa. A distinctive feature of the example is a presence of hidden nodes since AP1 and AP3 can't detect each other but both can be detected by AP2. Doing SR in such conditions leads to unfair medium distribution, as shown in FIGS. 5A-5B.

FIG. 5A provides an example of PPDU transmissions by the three access points with SR disabled. Interval 502 represents AP1's arbitration inter-frame spacing (AIFS) including any back-off (BO) adjustments from previous access conflicts. Each data-carrying PPDU is preceded by an AIFS/BO, and as indicated by interval 504 the AIFS/BO can vary based on the latency requirements of the PPDU content, with shorter AIFS values being used to increase the probability of low-latency transmission. A short interframe space (SIFS) 506 is provided between the end of the data-carrying PPDU and the receiving station's transmission of an acknowledgement frame (indicated by broken outline).

With SR disabled AP2 is unable to transmit while either AP1 or AP3 is transmitting, and conversely, while AP2 is transmitting neither AP1 nor AP3 can transmit. However, AP1 and AP3 are far enough apart to transmit concurrently when AP2 Is not transmitting. The interval during which AP2 cannot transmit may be prolonged by an interval $T_{end}$ 508 representing the time between the first transmission end (the end of transmission by AP1) and the time when AP2 can begin arbitrating for access, which doesn't begin until the end of the last conflicting transmission (the end of the transmission by AP3). Meanwhile, because AP1 cannot detect AP3's transmission, it begins arbitrating for access earlier, enabling it to obtain preferential access (and in so doing, to provide an advantage to AP3 due to the inhibition of AP2).

With SR enabled, the unfair access issue may be worsened. With SR enabled, AP2 and AP3 can transmit concurrently, though in the present example AP1 and AP2 remain unable to transmit at the same time. Once AP2 is able to transmit, AP3 can also transmit as shown in FIG. 5B. Though AP1 can begin arbitrating for access immediately after the end of AP2's transmission, AP2 cannot begin until the end of AP3's transmission, causing a delay of $T_{SRend}$ 510 and thereby providing AP1 with an advantage. Because SR is not permitted to begin during ACK frames, the delay caused by $T_{end}$ 508 also remains present. In fact, the AP1 and AP3 transmissions can become misaligned in a fashion that essentially prevents AP2 from regular access, whereas in the SR-disabled case AP2's transmissions acted to more or less align the operations of AP1 and AP3.

In at least some example embodiments, AP2 can act to control to address wait times when SR is enabled. Referring now to FIG. 5C, we note that each station specifies the expected length of each transmission, including the expected acknowledgement frame, using a duration value included in a frame header of each data-carrying PPDU. The other stations that detect the PPDU read this duration field and set their internal network allocation vector (NAV), which serves as an indicator to that station for how long it must defer from accessing the wireless medium assuming SR is disabled. (This enables each station to save power because they do not need to continuously perform sensing for other carrier transmissions.) Thus time 522 represents the normal duration setting that would be employed by AP2. But as FIG. 5C further illustrates, the station AP2 can measure an average $T_{SRend}$ 510 for some period of time and then extend the duration setting 526 written into outgoing packets to include the estimated $T_{SRend}$ 510. As time goes on, the $T_{SRend}$ estimate, and consequently the extended duration setting 528, can be refined. Stated in one fashion, this makes station AP1 aware of possible SR operation and prevents AP1 from early medium capture. Stated in another fashion, station AP2 can force station AP1 to begin arbitrating for the medium at the same time as station AP2, ensuring fair access. Station AP3 can continue to employ SR to increase overall network performance.

We note that the duration setting doesn't necessarily have to be extended for every packet transmitted by AP2, but rather it may be extended with some probability in order to reflect the actual periodicity of SR operations with AP3. Station AP2 may perform $T_{SRend}$ estimation and may also calculate SR probability (e.g., by constructing a histogram of $T_{SRend}$ measurements) at the same time. The calculations can be done continuously and/or update iteratively.

Even accounting for the potential use of extended durations, SR can still cause performance degradation by causing excessive transmission failures and re-tries under certain OBSS configurations. Thus it is not desirable to adopt a naive approach to the use of SR, e.g., by simply enabling SR whenever it is available. As centralized coordination for the operation of each access point in an OBSS is not available, it is left to the individual BSS's to autonomously determine when their AP should employ spatial reuse without suffering degradation from its use. In at least some example embodiments, the enablement of SR is considered in conjunction with channel selection and/or rate selection. For example, if "conflicting" BSS's can be moved to different channels, the overall medium throughput may increase.

FIG. 6 shows a timeline for a sequence of PPDUs being sent by a given access point to a given mobile station, and further shows a division of the timeline into intervals 602-616. In at least some example embodiments, the access point periodically varies the transmission settings, at times enabling SR, and at other times disabling SR, potentially varying the OBSS_PD levels, alone or in combination with variation of the channel and rate selections, to evaluate the communications performance for each combination of settings. Those setting combinations that provide enhanced performance are then chosen with gradually increasing probability and/or increasing durations while those with poorer performance are adaptively chosen with reduced probabilities and/or durations. Because network conditions are always subject to change, each combination is periodically re-evaluated even if it has previously exhibited poor performance.

Thus, in interval 602, the access point may have SR enabled, and may disable SR for interval 604. Interval 604 shows a failed PPDU transmission (i.e., without an acknowledgement frame) and a successful retry. The performance for interval 604 is accordingly judged to be poorer than that of interval 602. In some examples, the evaluations may be more gradual to reduce effects of transient interference events. The AP may accordingly increase the duration of interval 606, which is the next SR-enabled interval. In interval 608, SR is disabled and the PPDU transmission is delayed, again indicating poor performance. Interval 610 is accordingly lengthened again to permit greater use of SR-enabled transmissions. Interval 612, with SR disabled, this time yields good performance, causing the AP to reduce the relative length of the next SR-enabled interval 614. And so the process continues.

In the foregoing example, SR and non-SR are applied alternatingly with some periodicity to look at performance characteristics such as throughput and latency. Such periods are introduced for each pair of AP-STA. If performance during a SR period was higher than during a non-SR period, then the AP increases the probability or duration of the SR mode. Conversely, the probability or duration of the non-SR mode can be increased when the non-SR mode outperforms the SR mode. Initially both modes may have equal probability. Periods durations are to be long enough to gather sufficient statistics.

In an example implementation, the baseband processor 208 controls the parameters depending on statistics, for example, measured throughput, retry count, average contention duration, or some other suitable measure. (Other potentially suitable measures include average BUSY state duration, received signal strength indicator (RSSI) level, etc.) For example, let $T_{on}$ to be a duration of SR period and $p_{on}$ to be a probability to choose SR period. Similarly denote $T_{off}$ as a duration of non-SR period and $p_{off}=(1-p_{on})$ as probability to choose non-SR period. Let these parameters control duration and probability of a mode change at the end of each period. The baseband processor operations in this example include: (1) setting $p_{off}$ to a high value (e.g., 90%) if retries are observed in the most recent SR period and not observed in the most recent non-SR period; (2) increasing $p_{on}$ (e.g., +5% to a maximum of 95%) if throughput during the most recent SR period is higher than for the most recent non-SR period; (3) increasing $p_{off}$ (e.g., +5% to a maximum of 95%) if throughput during the most recent non-SR period is higher than for the most recent SR period; (4) initiating a channel selection change (if available) or setting $p_{off}$ to a high value (e.g., 90%) if throughput in the most recent SR period is significantly lower (e.g., less than half), with much higher contention durations, than in the most recent non-SR period; (5) setting $p_{on}$ to a high value (e.g., 90%) if the throughput in the most recent SR period is significantly higher than (e.g., more than twice) the throughput in the most recent non-SR period.

In an example implementation that varies duration rather than probability, the baseband processor cycles through each combination of transmission settings, allocating one interval to each combination having at least a minimum duration that is sufficient to provide for transmission of at least one of said data units. The baseband processor measures performance for each interval in the cycle and modified the interval durations for the subsequent cycle based on the measured performances. Thus, for example, the baseband processor may: (1) set an SR-on interval duration to a predetermined minimum value (e.g., length of a PPDU and ACK) and increase the SR-off interval duration (e.g., 20% up to a predetermined maximum number of PPDU transmissions) if retries are observed in the most recent SR interval and not observed in the most recent non-SR interval; (2) increase SR-on interval duration (e.g., +5% up to the predetermined max) and decrease SR-off interval duration (e.g., –5% down to the predetermined minimum) if throughput during the most recent SR period is higher than for the most recent non-SR period; (3) increase SR-off interval duration (e.g., +5% up to max) and decrease SR-on interval duration (–5% down to minimum) if throughput during the most recent non-SR period is higher than for the most recent SR period; (4) initiate a channel selection change (if available) or setting SR-off interval duration to a high value (e.g., 90% of max) if throughput in the most recent SR period is significantly lower (e.g., less than half), with much higher contention durations, than in the most recent non-SR period; (5) setting SR-on interval duration to a high value (e.g., 90% of max) if the throughput in the most recent SR period is significantly higher than (e.g., more than twice) the throughput in the most recent non-SR period.

Thus, an adaptive SR technique is presented which collects and analyzes performance statistics and can adapt SR application to changing conditions in a fashion that increases the probability and/or duration of use for those combinations of transmission settings that are associated with enhanced performance. In some embodiments, the combination of transmission settings that provides the best performance (e.g., the highest throughput, lowest latency, lowest retry count, lowest average contention duration, etc., or some suitable combination of such measures) is chosen with the maximum probability or duration as the other combinations are provided the minimum probability or duration. In other embodiments, probability or duration is set in proportion to the performance measure, subject to predetermined minimum and maximum values. In still other embodiments, the combinations are ranked according to performance and their probabilities or durations are set pursuant to their ranking. In other embodiments, additional factors are taken into account such that the combination yielding the "best" performance is not necessarily always preferred (i.e., assigned the highest probability or duration). For example, if multiple combinations yield comparable performance measurements, the combination having the lowest variance in its performance measure may be preferred.

The adaptive SR control works for every link separately, enabling SR to be applied only to those transmissions that can benefit from it. The adaptive SR control method may further provide coordinated control for channel selection and rate adaptation procedures. In other words, FIG. 6 showed only traffic between a given access point and one mobile station for explanatory purposes. In at least some example embodiments, the access point concurrently maintains a wireless links with each of multiple mobile stations, periodically vary the transmission settings to each so as to separately evaluate the performance of each combination of wireless transmission setting values for each of the multiple stations. Based on these individualized evaluations, the access point assigns wireless transmission settings to different intervals of data unit transmission to each of the multiple stations independently of the settings for other stations.

In at least some example embodiments, the baseband processor scans all channels and picks the least busy one. Sometimes it may be not obvious which channel to choose because of near-equal load. The baseband processor may then employ the adaptation method to evaluate those multiple channels which are candidates for the "least busy". The adaptive SR control method applies the previously-described sampling technique to each of the channels to pick the channel and SR mode which most improves performance.

At least some example embodiments employ the multi-channel testing technique even when one channel appears to be the clear choice for "least busy". This approach accounts for the situation where channels with less load can nevertheless perform worse than a busier one because they may be subject to adjacent channel interference (ACI) that can cause failed transmissions even when the channel appears to be clear. Further, when ACI is present, the hidden node problem is exacerbated. The adaptive SR control/channel selection method can detect such poor channel conditions and find the combination(s) of settings that offer enhanced performance.

At least some example embodiments incorporate rate adaptation as part of the SR control adaptation method. The standard specifies different modulation coding schemes (MCS) that vary the number of data bits being transported by each channel symbol. Rate adaptation attempts to select the MCS that offers the highest bit rate subject to completing the PPDU transmissions successfully (at least most of the time). The higher MCS rates offer higher throughputs, but also make the transmissions less resistant to interference. When SR is enabled, OBSS transmissions may cause additional interference but also offer another mechanism for a given station to obtain increased throughput. If SR enablement causes too many transmission failures, a reduction in the MCS rate may correct the problem. So long as the throughput loss caused by the loser MCS rate selection is sufficiently offset by the throughput gain offered by SR, the result is expected to be a net gain in performance. The adaptive rate/SR control method coordinates SR and rate adaptations to assist with determining a trade-off between MCS and SR.

FIG. 7 is a flow diagram of an illustrative method for adapting a combination of transmit settings include SR enablement. The method may be implemented, for example, by the baseband processor 208 in each station. The method may be embodied on a non-transitory information storage medium as software or firmware that, when executed by a programmable processor, configures the programmable processor to carry out the method.

The method begins in block 702 when an access point establishes a wireless link with a mobile station. In block 704, both the access point and the mobile station each identify the range of options for each transmission parameter including channel, MCS rate, and spatial reuse capability. In block 706, each station initializes the performance measure(s) for each combination of options. For example, throughput may be used as a performance measure and initially set to zero. A transmission failure count may also be set to zero for each combination.

In block 708, each station may design a cycle that includes an interval spent using each of the possible combinations, with the interval durations being set based on the relative performance measures. In an alternative embodiment, the station set a probability for using each of the combinations to be used at the end of each interval to choose the settings for the next interval. In this alternative embodiment, the intervals may have a fixed length or may have a length that varies based on past performance. The cycle may be chosen to have a fixed total duration or may be chosen to be a predetermined number of intervals.

Each station then enters an inner loop (blocks 710-714). In block 710, the station sets the appropriate settings in the frame header fields and uses the chosen combination of channel, MCS rate, and SR mode to send PPDUs during the current interval. The station measures the performance (e.g., throughput, contention delays, transmission failures, or other suitable statistic) and in block 712 updates the score for the chosen combination. In block 714, the station determines whether the current cycle is complete, and if not, determines the combination for the next interval, returning to block 710.

Once the cycle is complete, in block 716 the station determines whether or not the link should be maintained or terminated. If the link is to be maintained, control returns to block 708 for planning the next cycle. Otherwise the link is terminated in block 718 and the method concludes. Note that each wireless link may be associated with a separate instance of the method.

To recapitulate, Spatial Reuse was introduced in 802.11ax as a way to increase usage efficiency of the wireless medium in dense scenarios. But even when it is permitted by the standard, SR may have detrimental consequences. Its performance is highly dependent on the specific scenario. For instance, the presence of hidden nodes can lead to unfair medium distribution. The standard's OBSS_PD-based SR mechanism doesn't consider the level of interference on receiving nodes, so the location of receiving stations can also be important. Wireless stations will benefit from using additional information when determining whether to employ SR, and in accordance with the present disclosure this additional information can be obtain using a systematic sampling technique using SR and non-SR periods to adapt SR application to changing conditions. This makes it possible to benefit from SR when it improves the performance and to avoid the performance degradation associated with using SR in unsuitable conditions. Sampling can be successfully used together with a channel selection algorithm. The decision-making unit can suggest switching to a different channel where system performance will be better able to benefit from SR.

Various example implementations will be apparent to those skilled in the art for dense scenarios with multiple stationary or mobile APs in proximity with or without changing distances. Some examples including multiple APs or hotspots in apartment buildings, stadiums, meeting rooms, outdoor crowds of smartphones, automobiles, etc. In an example, two automobiles equipped with APs can come in and out of proximity to each other where the APs operate in overlapping ranges and adaptive SR can improve communication performance by controlling stations connections to the APs.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

An example apparatus can be multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

The components and processes disclosed herein may be implemented singly or in combination by: hardware, circuits, firmware, software, or a processor executing computer program code; coupled to the wireless transceiver's transmit and receive path components, without departing from the scope of the disclosure. Moreover, the various functions described can be performed in a single unit, or can be spread across a number of components in any number of ways.

The example implementations may have various differences and advantages over related art. Moreover, other implementations of the present application will be apparent to those skilled in the art from consideration of the specification and practice of the teachings of the present application. Various aspects and/or components of the described example implementations may be used singly or in any combination. It is intended that the embodiments described in the specification and drawings be considered as examples only, with the true scope and spirit of the present application being indicated by the following claims.

What is claimed is:

1. A wireless network station that comprises:
    a baseband processor that frames data units for wireless transmission to a given station during a series of data unit transmission intervals, each data unit transmission interval having a combination of wireless transmission setting values including:
        a value for an IEEE 802.11ax-compliant Spatial Reuse Parameter ("SRP")-based spatial reuse setting;
        a value for an IEEE 802.11ax-compliant Overlapping Basic Service Sets Packet Detection ("OBSS_PD") level-based spatial reuse setting; and
        a value for an IEEE 802.11ax-compliant modulation coding scheme (MCS) rate selection; and
    a radio frequency integrated circuit (RFIC) that couples the baseband processor to one or more antennas,
    the baseband processor systematically assigning each combination of spatial reuse setting values from a set of multiple possible combinations of spatial reuse setting values to periodically reevaluate a performance for each combination in the set, and causing combinations of spatial reuse setting values associated with enhanced performance to be employed with an increased probability or duration relative to combinations of spatial reuse setting values associated with inferior performance.

2. The wireless network station of claim 1, wherein the spatial reuse setting values include: enabled Spatial Reuse Parameter (SRP) based reuse, disabled SRP based reuse, and multiple different Overlapping Basic Service Sets Packet Detection ("OBSS_PD") levels.

3. The wireless network station of claim 2, wherein the wireless transmission setting values include selected channels.

4. The wireless network station of claim 1, wherein the evaluation of performance is based on one or more of: throughput, latency, retry count, and average contention duration.

5. The wireless network station of claim 1, wherein the baseband processor concurrently frames data units for wireless transmission to multiple stations, and wherein the baseband processor separately reevaluates the performance of each combination of spatial reuse setting values for each of the multiple stations, and separately assigns combinations of spatial reuse values to data unit transmission intervals for each of the multiple stations.

6. The wireless network station of claim 1, further comprising memory that stores firmware, the firmware configuring the baseband processor to perform said systematic assigning and the periodic reevaluation.

7. The wireless network station of claim 1, wherein each of the data unit transmission intervals in the series provides for transmission of at least one of said data units, wherein the baseband processor allocates a probability for each combination of spatial reuse setting values in the set, and wherein the baseband processor adjusts the probabilities based on measurements of said performance.

8. The wireless network station of claim 1, wherein each of the data unit transmission intervals provides for transmission of at least one of said data units, wherein the baseband processor groups multiple such data unit transmission intervals into each of multiple cycles, and wherein the baseband processor adjusts durations of the data unit transmission intervals associated with each combination of spatial reuse setting values in the set based on measurements of said performance.

9. The wireless network station of claim 1, wherein the wireless network station operates as a wireless network access point.

10. A wireless communication method that comprises:
   framing data units for wireless transmission to a given station over a series of multiple data unit transmission intervals, each data unit transmission interval providing for transmission of at least one said data unit and having an associated combination of wireless transmission setting values including:
      a value for an IEEE 802.11ax-compliant Spatial Reuse Parameter ("SRP")-based spatial reuse setting;
      a value for an IEEE 802.11ax-compliant Overlapping Basic Service Sets Packet Detection ("OBSS_PD") level-based spatial reuse setting; and
      a value for an IEEE 802.11ax-compliant modulation coding scheme (MCS) rate selection; and
   assigning each combination of spatial reuse setting values from a set of multiple possible combinations of spatial reuse setting values to data unit transmission intervals in the series to periodically reevaluate a performance for each combination in the set, said assigning including employing a combination of spatial reuse setting values associated with enhanced performance with an increased duration or probability relative to a combination of spatial reuse setting values associated with inferior performance.

11. The wireless communication method of claim 10, wherein the spatial reuse setting values include: enabled Spatial Reuse Parameter (SRP) based reuse, disabled SRP based reuse, and multiple different Overlapping Basic Service Sets Packet Detection ("OBSS_PD") levels.

12. The wireless communication method of claim 11, wherein the wireless transmission setting values include selected channels.

13. The wireless communication method of claim 10, wherein the evaluation of performance is based on one or more of: throughput, latency, retry count, and average contention duration.

14. The wireless communication method of claim 10, wherein said framing and varying are performed concurrently for wireless transmissions to multiple stations.

15. The wireless communication method of claim 10, further comprising allocating a probability for each combination in the set; and adjusting the probabilities based on measurements of said performance.

16. The wireless communication method of claim 10, wherein the multiple data unit transmission intervals are grouped into multiple cycles, and the method further comprises, for each cycle, adjusting durations of the data unit transmission intervals associated with each combination of spatial reuse setting values based on measurements of said performance.

17. A non-transitory information storage medium comprising instructions that, when executed by a processor, cause the processor to implement a wireless communications method including:
   framing data units for wireless transmission to a given station over a series of multiple data unit transmission intervals, each data unit transmission interval providing for transmission of at least one said data unit and having an associated combination of wireless transmission setting values including:
      a value for an IEEE 802.11ax-compliant Spatial Reuse Parameter ("SRP")-based spatial reuse setting;
      a value for an IEEE 802.11ax-compliant Overlapping Basic Service Sets Packet Detection ("OBSS_PD") level-based spatial reuse setting; and
      a value for an IEEE 802.11ax-compliant modulation coding scheme (MCS) rate selection; and
   assigning each combination of spatial reuse setting values from a set of multiple possible combinations of spatial reuse setting values to data unit transmission intervals in the series to periodically reevaluate a performance for each combination in the set, said assigning including employing a combination of spatial reuse setting values associated with enhanced performance with an increased duration or probability relative to a combination of spatial reuse setting values associated with inferior performance.

18. The non-transitory information storage medium of claim 17, wherein the spatial reuse setting values include: enabled Spatial Reuse Parameter (SRP) based reuse, disabled SRP based reuse, and multiple different Overlapping Basic Service Sets Packet Detection ("OBSS_PD") levels.

19. The non-transitory information storage medium of claim 18, wherein the wireless transmission setting values include selected channels.

* * * * *